United States Patent [19]
Ejiri et al.

[11] Patent Number: 4,601,271
[45] Date of Patent: Jul. 22, 1986

[54] THROTTLE VALVE CONTROLLING APPARATUS
[75] Inventors: Yuuki Ejiri; Tomoo Ito; Hiroshi Kamifuji, all of Katsuta, Japan
[73] Assignee: Hitachi, Ltd., Tokyo, Japan
[21] Appl. No.: 687,726
[22] Filed: Dec. 31, 1984
[30] Foreign Application Priority Data
  Mar. 9, 1984 [JP] Japan ................. 59-43946
[51] Int. Cl.[4] .......................... F02D 41/00
[52] U.S. Cl. ..................... 123/361; 123/399
[58] Field of Search ............ 123/352, 361, 399
[56] References Cited
U.S. PATENT DOCUMENTS
  4,305,359 12/1981 Mann et al. ............ 123/361
  4,409,940 10/1983 Gaus .................... 123/361
  4,488,527 12/1984 Pfalzgraf et al. ........ 123/399
  4,523,565 6/1985 Omitsu .................. 123/399

Primary Examiner—William A. Cuchlinski, Jr.
Attorney, Agent, or Firm—Antonelli, Terry & Wands

[57] ABSTRACT

An apparatus for controlling an opening degree of a throttle valve comprises a motor including a rotor, a detector for detecting the opening degree of the throttle valve, and a control unit for outputting a command to the motor so as to swing the throttle valve to the desired opening degree which is determined by the control unit in accordance with the information representing the engine condition. The apparatus further comprises a one-piece shaft which includes a throttle valve shaft and an output shaft of the rotor of the motor.

3 Claims, 2 Drawing Figures

THROTTLE VALVE CONTROLLING APPARATUS

BACKGROUND OF THE INVENTION

The present invention relates to an apparatus for controlling an opening degree of a throttle valve of an internal combustion engine, and more particularly to internal combustion engine for a motor vehicle.

It has been proposed to provide a motor control for a throttle valve for an internal combustion engine of a motor vehicle wherein a motor and a throttle valve are separately provided, and an output shaft of a rotor portion of the motor is connected to a throttle valve shaft of the throttle valve through coupling means, and wherein an opening degree of the throttle valve is changed in accordance with a swing movement of the output shaft of the motor.

This structure, however, necessitates a large number of elements and a large accommodating space and, by virtue of the number of elements, the number of manufacturing steps increases the raising of the overall manufacturing cost. Furthermore, by interposing the coupling means between the motor and the throttle valve it is possible that a sure torque transmission from the output shaft of the motor to the throttle valve shaft, and/or the throttle valve and/or the output shaft may not smoothly swing due to the difficulties in respect of precision of setting the throttle valve shaft and the output shaft of the motor.

Accordingly it is an object of the present invention resides in providing a throttle valve control apparatus which is free from the drawbacks and the risk described above.

To this end, the present invention provides a throttle valve control apparatus in which a one-piece shaft includes a throttle valve shaft and the output shaft of the rotor portion of the motor.

DETAILED DESCRIPTION

The above and other objects and the features of the present invention will be apparent from following description and the attached drawings.

Figure 1:
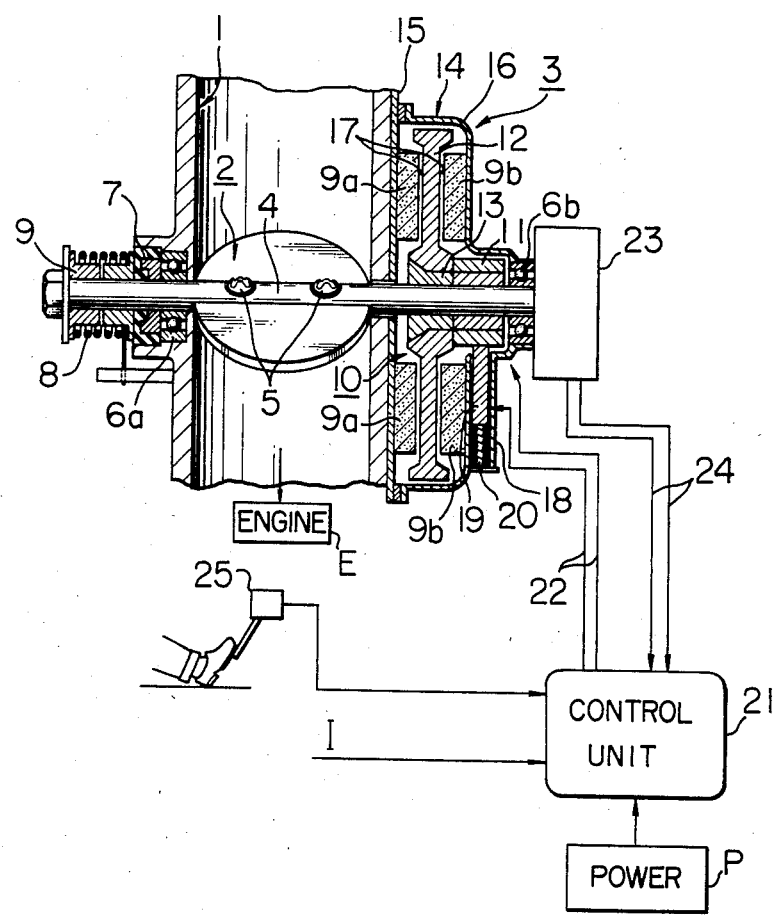
FIG. 1 is a fragmentary sectional view of a portion of an engine to which one embodiment of the present invention is applied.

Referring now to the drawings wherein like reference numerals are used throughout the various views to designate like parts and, more particularly, to FIG. 1, according to this figure, a throttle valve controlling apparatus includes a throttle valve generally designated by the reference numeral 2 provided in an induction or negative pressure cylinder 1 through which air-fuel mixture is supplied to an engine E, and a motor generally designated by the reference numeral 3 which is mounted on a portion of a peripheral wall surface of the induction cylinder 1. The throttle valve 2 is fixed to a one-piece throttle valve shaft 4 which extends diametrically through the induction cylinder 1. The throttle valve 2 is inserted into diametrical through slit which is formed in the throttle valve shaft 4, and is located and fixed on the throttle valve shaft 4 by two fastener such as, for example, screws 5. The throttle valve shaft 4 is carried at respective opposite end portions thereof by ball bearings 6a, 6b.

A dust seal 7 is disposed adjacent the ball bearing 6a at one end portion of the shaft 4 and around the shaft 4 so as to prevent dust from entering into the induction cylinder 1. A torsion coil spring 8 is so disposed between the end of the shaft 4 and the seal 7 such that one end thereof is secured to the induction cylinder wall and the other end thereof is secured to the valve shaft 4. The torsion coil-spring 8 is mounted to urge the throttle valve 2 into a fully closed condition due to its return torque. Accordingly, even when the motor 3 malfunctions during the operation of the engine, the throttle valve 2 is returned to the fully closed condition and then the running of the engine is stopped. A collar 9 retains the torsion coil-spring 8 in an appropriate state.

A rotor generally designated by the reference numeral 10 of the motor 3 is closely mounted on the other end portion of the throttle valve shaft 4. The rotor 10 has a generally disk-like shape, and includes a commutator 11, a resinified armature winding 12 and a cylindrical base 13 carrying the resinified armature winding. The motor 3, further includes a casing 14 which is composed of a mounting base 15 secured to the peripheral wall surface of the induction cylinder 1 and a pan-shaped cover 16 fitted to the mounting base 15. Permanent magnets 9a, 9b are respectively secured to the mounting base 15 and the cover 16 so that the armature winding 12 is interposed between the magnets 9a, 9b. The permanent magnets 9a, 9b are axially aligned and are circumferentially equiangularly spaced. In the embodiment of FIG. 1, the radial intermediate portions of the opposite end surfaces of the disk-like armature winding 12 are provided with annular recesses 17, 17 into which the permanent magnets 9a, 9b extend. Accordingly, the axial distance between the magnets 9a, 9b decreases and the magnetic flux density in the magnetic field of the motor 3 increases. A brush cover 18, containing a brush 19, is attached to the cover 16. The brush 19 is urged by a spring 20 in the brush cover 18 and is press fitted into the commutator 11. Another brush appratus (not shown) of the same structure is also attached to the cover 16 at a position circumferentially spaced by 90 degrees in relation to the axis of the throttle valve shaft. Power P is supplied from the commutator 11 to the armature winding 12 through a control unit 21, lines 22 and the brushes 19.

A detector 23 is provided at the other end of the throttle valve shaft 4, opposite to the dust seal 7, for detecting an opening degree of the throttle valve 2, with a the ball bearing 6b being interposed between the motor 3 and the detector 23. The detector 23 is fixed on the cover 16 of the motor casing 14. An amount of swing of the throttle valve shaft 4 is detected by the detector 23 and a signal, corresponding to the opening degree of the throttle valve 2, is fed to the control unit 21 by the detector 23 through lines 24. The detector 23 includes an encoder or a potentiometer.

The control unit 21 receives signals from the detector 23 and other signals from a device for transmitting commands from an operator, such as an accelerator 25, and information I such as the rotational speed of the engine shaft, the position of the transmission, or the pressure in the induction cylinder 1.

In the embodiment of FIG. 1, the control unit 21 determines the desired opening degree of the throttle valve in accordance with the signals from the accelerator 25 and the information I representing the engine conditions, and supplies power P to the rotor 10 of the motor 3 so as to match the opening degree of the throttle valve 2 with the desired opening degree. The control of the opening degree of the throttle valve 2 is achieved by balancing the return torque of the torsion coil-spring 8 with the driving torque of the rotor 10, i.e., the driving torque of the throttle valve shaft 4. When it is necessary to more widely open the throttle valve 2, more current is supplied to the rotor 10 so as to open the throttle valve against the return torque of the torsion coil-spring 8. At this time, the signals from the detector 23 are fed back to the control unit 21, whereby the amount of the current to be supplied to the rotor 10 is controlled. To the contrary, if it is necessary to close the throttle valve 2, less current is supplied to the rotor 10 so that the return torque of the torsion coil-spring 8 overcomes the driving torque of the rotor 10 and closes the throttle valve 2. When the torsion coil-spring 8 malfunctions, the throttle valve 2 can not be closed. However, in this case, the control unit 21 may detect any defect or malfunctioning in the torsion coil-spring 8 by the fed back signals from the detector 23. The control unit 21 informs the operator the motor vehicle of the trouble and, at the same time, controls the throttle valve 2 by supplying a reverse current. If the motor 3 malfunctions, it is impossible to control the throttle valve 2, but the return torque of the torsion coil-spring 8 can close the throttle valve 2 as described above. Therefore, irregular operation of the engine E is prevented even when either the torsion coil-spring 8 or the motor 3 malfunctions.

Figure 2:
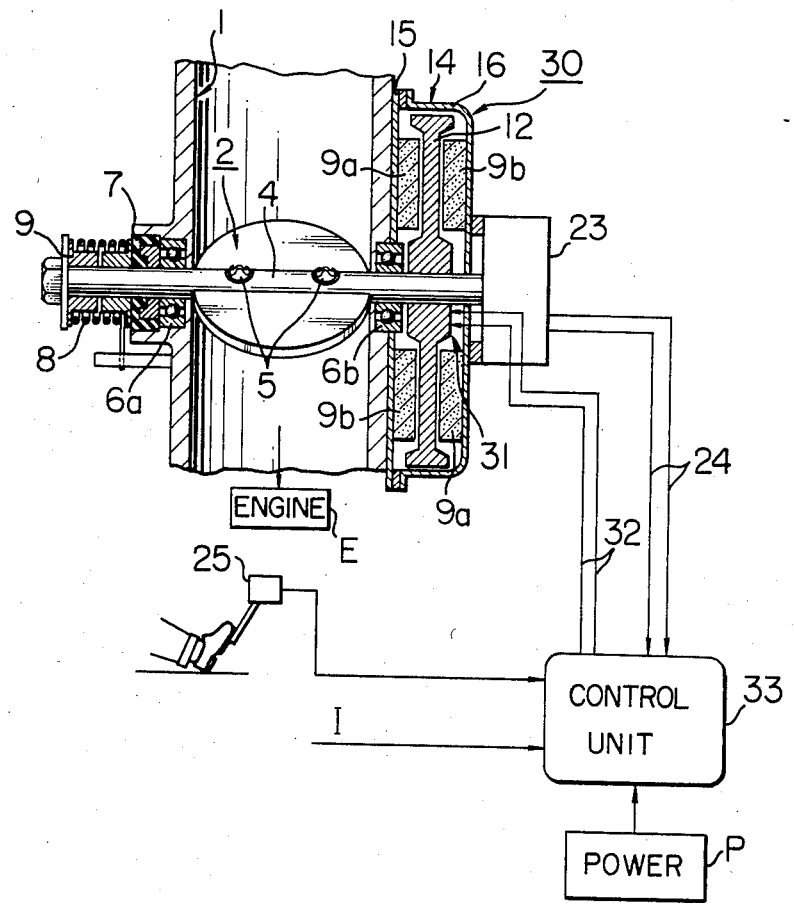
FIG. 2 is a fragmentary sectional view of a portion of an engine to which another embodiment of the present invention is applied.

In the embodiment of FIG. 2, a motor generally designated by the reference numeral 30 includes a rotor 31 without a commutator and permanent magnets 9a, 9b. Both ball bearings 6a, 6b are attached to the cylinder wall. The rotor 31 is disposed on a shaft portion between the ball bearing 6b and the detector 23 which is mounted on an end of a one piece throttle valve shaft 4. The rotor 31 has a generally disk-like shape and includes the armature winding 12, with the armature winding 12 and the throttle valve shaft 4 being integrally impregnated with resins. The lead wires 32 of the armature winding 12 are directly connected to a control unit 33.

In the embodiment shown in FIG. 1, the direction of the current which flows through the rotor is controlled by the commutator 11 and brushes 19, but in the embodiment in FIG. 2, the current to be supplied to the rotor 31 is controlled by the control unit 33 in dependence upon the signals representing an error between a value of the desired opening degree of the throttle valve 2 and the output from the detector 23.

In the embodiment shown in FIG. 2, the apparatus can be made smaller than the one in FIG. 1, and the noise and wear caused by a contact between the commutator and the brushes of the embodiment shown in FIG. 1 can be eliminated, whereby its life is lengthened.

According to the present invention, since the throttle valve and the rotor of the motor are mounted on the one-piece shaft, a swing movement of the throttle valve is made smoothly and effectively. In addition, the number of elements decreases due to a lack of the coupling means, so that a lower inertia and a rapid response are obtained.

What is claimed is:

1. An apparatus for controlling an opening degree of a throttle valve fixed to a throttle valve shaft for swing movement around an axis of said throttle valve shaft so as to control an air-fuel mixture flow to be supplied to an engine, the apparatus comprising:
    a motor including a rotor portion which is associated with said throttle valve shaft to swing said throttle valve;
    means for detecting an amount of swing movement of said throttle valve and for producing a signal corresponding to the opening degree of said throttle valve;
    a control unit for receiving and judging said signal from the detecting means and for outputting a command to said motor so as to swing said throttle valve in a desired opening degree;
    a one piece throttle valve shaft on which said throttle valve and said rotor portion of said motor are separately disposed; and
    wherein said rotor portion and said one piece shaft are molded together.

2. An apparatus for controlling an opening degree of a throttle valve fixed to a throttle valve shaft for swinging movement around an axis of said throttle valve shaft so as to control an air-fuel mixture flow to be supplied to an engine, the apparatus comprising:
    a motor including a rotor portion which is associated with said throttle valve shaft to swing said throttle valve;
    means for detecting an amount of swing movement of said throttle valve and for producing a signal corresponding to the opening degree of said throttle valve;
    a control unit for receiving and judging said signal from the detecting means and for outputting a command to said motor so as to swing said throttle valve in a desired opening degree;
    a one piece throttle valve shaft on which said throttle valve and said rotor portion of said motor are separately disposed, said rotor portion is mounted to said one piece shaft; and
    a torsion-spring disposed in one end portion of said one piece shaft opposite to said motor so as to urge said shaft so as to close said throttle valve.

3. An apparatus as claimed in claim 2, wherein said rotor portion and said one piece shaft are molded together.

* * * * *